United States Patent
Speer

(10) Patent No.: US 8,251,039 B2
(45) Date of Patent: Aug. 28, 2012

(54) HEAT SHIELD

(75) Inventor: Andreas Speer, Köln (DE)

(73) Assignee: Federal-Mogul Sealing Systems GmbH, Herdorf (DE)

( * ) Notice: Subject to any disclaimer, the term of this patent is extended or adjusted under 35 U.S.C. 154(b) by 785 days.

(21) Appl. No.: 12/162,025

(22) PCT Filed: Nov. 4, 2006

(86) PCT No.: PCT/DE2006/001933
§ 371 (c)(1),
(2), (4) Date: Jul. 24, 2008

(87) PCT Pub. No.: WO2007/085213
PCT Pub. Date: Aug. 2, 2007

(65) Prior Publication Data
US 2009/0038578 A1    Feb. 12, 2009

(30) Foreign Application Priority Data
Jan. 24, 2006   (DE) .................... 10 2006 003 229

(51) Int. Cl.
*F02B 77/04* (2006.01)
(52) U.S. Cl. .................. 123/198 E; 123/195 C; 60/323
(58) Field of Classification Search ............... 123/198 E, 123/195 C
See application file for complete search history.

(56) References Cited

U.S. PATENT DOCUMENTS

| | | | | |
|---|---|---|---|---|
| 4,179,884 A | * | 12/1979 | Koeslin | 60/321 |
| 5,233,953 A | * | 8/1993 | Whitehurst et al. | 123/198 E |
| 5,603,294 A | * | 2/1997 | Kawai | 123/90.16 |
| 5,603,297 A | * | 2/1997 | Wolf et al. | 123/195 C |
| 5,649,510 A | * | 7/1997 | Linze | 123/198 E |
| 5,844,177 A | * | 12/1998 | Pirchl | 181/211 |
| 6,318,734 B1 | | 11/2001 | Boskamp | |
| 6,438,949 B1 | * | 8/2002 | Nozaki | 60/322 |
| 6,598,389 B2 | * | 7/2003 | Chen et al. | 60/323 |
| 7,162,868 B2 | * | 1/2007 | Funakoshi | 60/323 |
| 2002/0000222 A1 | * | 1/2002 | Matsuura et al. | 123/568.11 |
| 2003/0024299 A1 | * | 2/2003 | Fujita et al. | 73/23.31 |
| 2003/0101719 A1 | | 6/2003 | Farkas | |
| 2005/0193726 A1 | * | 9/2005 | Funakoshi | 60/323 |

FOREIGN PATENT DOCUMENTS

| | | |
|---|---|---|
| DE | 2632467 B2 | 1/1977 |
| DE | 2742934 A1 | 3/1978 |
| DE | 7515237 | 2/1979 |
| DE | 3002837 A1 | 7/1981 |
| DE | 41 11 245 A1 | 10/1991 |
| DE | 19704436 C2 | 8/1998 |
| DE | 1316691 A1 | 6/2003 |
| DE | 1528231 A1 | 5/2005 |
| EP | 1548246 A1 | 6/2005 |
| JP | 62-162334 | 10/1987 |

* cited by examiner

Primary Examiner — Noah Kamen
Assistant Examiner — Long T Tran
(74) *Attorney, Agent, or Firm* — Robert L. Stearns; Dickinson Wright, PLLC

(57) ABSTRACT

A heat shield includes a plurality of elements for shielding temperature-sensitive components. The elements are substantially matched to the respective contour of the component which is to be shielded and which at least partially overlap one another. The elements are fixed but moveable relative to one another in an overlapping region.

10 Claims, 2 Drawing Sheets

HEAT SHIELD

BACKGROUND ON THE INVENTION

1. Technical Field

Figure 1:
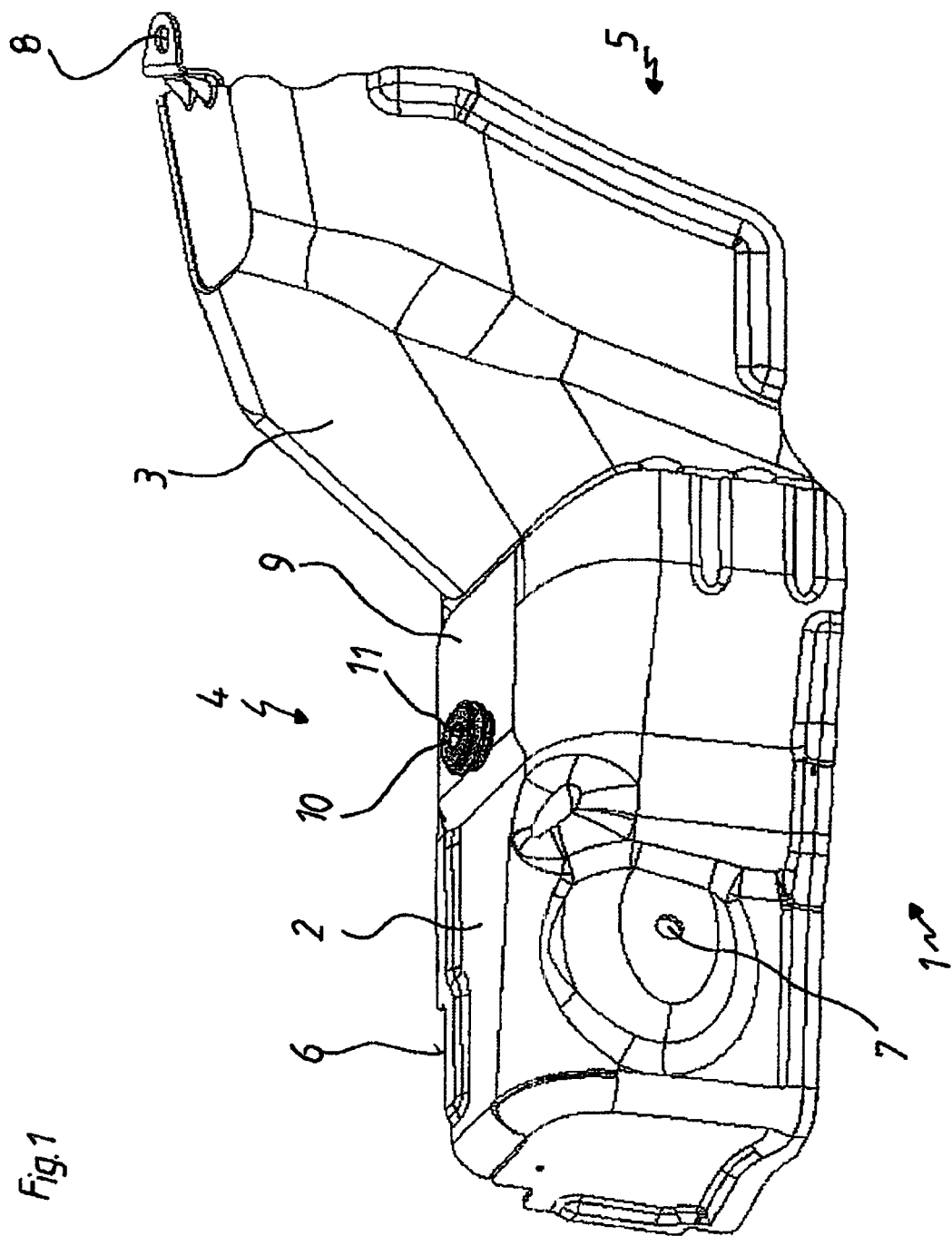

The invention relates to a heat shield, composed of a plurality of elements, for shielding components influenced by temperature.

2. Related Art

The use of heat shields for shielding components influenced by temperature, such as vehicle exhaust manifolds or the like, is generally known. In the typically one-piece, rigidly connected heat shields used in this case, thermally-related changes in length of the particular component influenced by temperature may result in failure. Under the influence of temperature, exhaust manifolds in particular may expand by as much as 5 mm. This causes stress on the heat shield at the region of its attachment, which may lead to crack formation as the result of additional vibrations in the exhaust gas system.

In such cases decoupling elements are used as needed to address the referenced manifestations of failure.

A stationary heat shield is described in JP-A 2001347323 which has a sandwich structure and a plurality of uniform or nonuniform patterns having a hill-and-valley shape. This heat shield is securely connected via screws to the component to be shielded. The heat shield has a one-piece design, and is essentially adapted to the shape of the component to be shielded. The disadvantages previously described for the general prior art are present here as well.

Depending on the complexity of the component to be shielded, however, it is not always possible to provide a one-piece heat shield.

SUMMARY OF THE INVENTION

The object of the present invention is to provide a heat shield which may be adapted even to complex structures of a component to be shielded, and which can easily compensate for the thermally-related changes in length of the component, without the described technical problems.

This object is achieved by use of a heat shield, composed of a plurality of elements, for shielding components influenced by temperature, formed by elements which are essentially adapted to the respective contour of the component to be shielded and which at least partially overlap one another, wherein the elements are provided so as to be fixed at least in places but moveable relative to one another in the overlapping region.

By use of a heat shield composed of a plurality of elements, in which the individual elements are movable relative to one another, even more complicated structures of the component to be shielded may be easily adapted without resulting in the technical problems described at the outset. The individual elements are movable relative to one another in the region of their fixed attachment in order to allow for the thermally-related changes in length of the component to be shielded.

At least one fixing element is used which is provided in the region of adjacent elements. The fixing element allows the adjacent elements to be fixed in place in the region of at least one point, but to be movably supported relative to one another so that compensation may be made for thermally-related changes in length of the component, in particular a vehicle exhaust manifold, without damaging the heat shield.

The following advantages are also realized in comparison to the prior art:

Prevention of stress cracks on the heat shield,
Reduction of attachment points for the individual elements,
A movable connection of two or more elements of a heat shield,
From a logistical standpoint, provision of a single heat shield formed from a plurality of elements, and
Capability for providing complex geometries of the components to be shielded.

Since the adjacent elements at least partially overlap one another, it may be sufficient for storage, transport, and installation purposes to join the adjacent elements together in an articulated manner solely in the region of a single point. Of course, if this is not sufficient, multiple fixing points may be provided.

According to a further concept of the invention, in an end region of one element a projection having an approximately platelike design is provided which faces in the direction of the adjacent element. The fixing point may then be provided in the region of the plate projection.

The fixing element itself advantageously has an approximately cross-shaped design, wherein the leg regions extending parallel to the elements form sliding surfaces for the individual elements to slide relative to one another in order to compensate for thermally-related changes in length of the component to be shielded.

Depending on the application, it may be meaningful to form profiles from the materials of the adjacent elements facing in the direction of the particular leg region, thereby forming point-shaped sliding elements. The leg of the fixing element which is not parallel to the elements may be designed as a hollow body, wherein the free leg ends, at least on the projection side, are bent, in particular flanged, in the direction of the projection.

The hollow body may also accommodate a rivet by means of which an articulated connection is then established between the adjacent elements. The particular type of connection established by one skilled in the art depends on the application.

THE DRAWINGS

Figure 2:
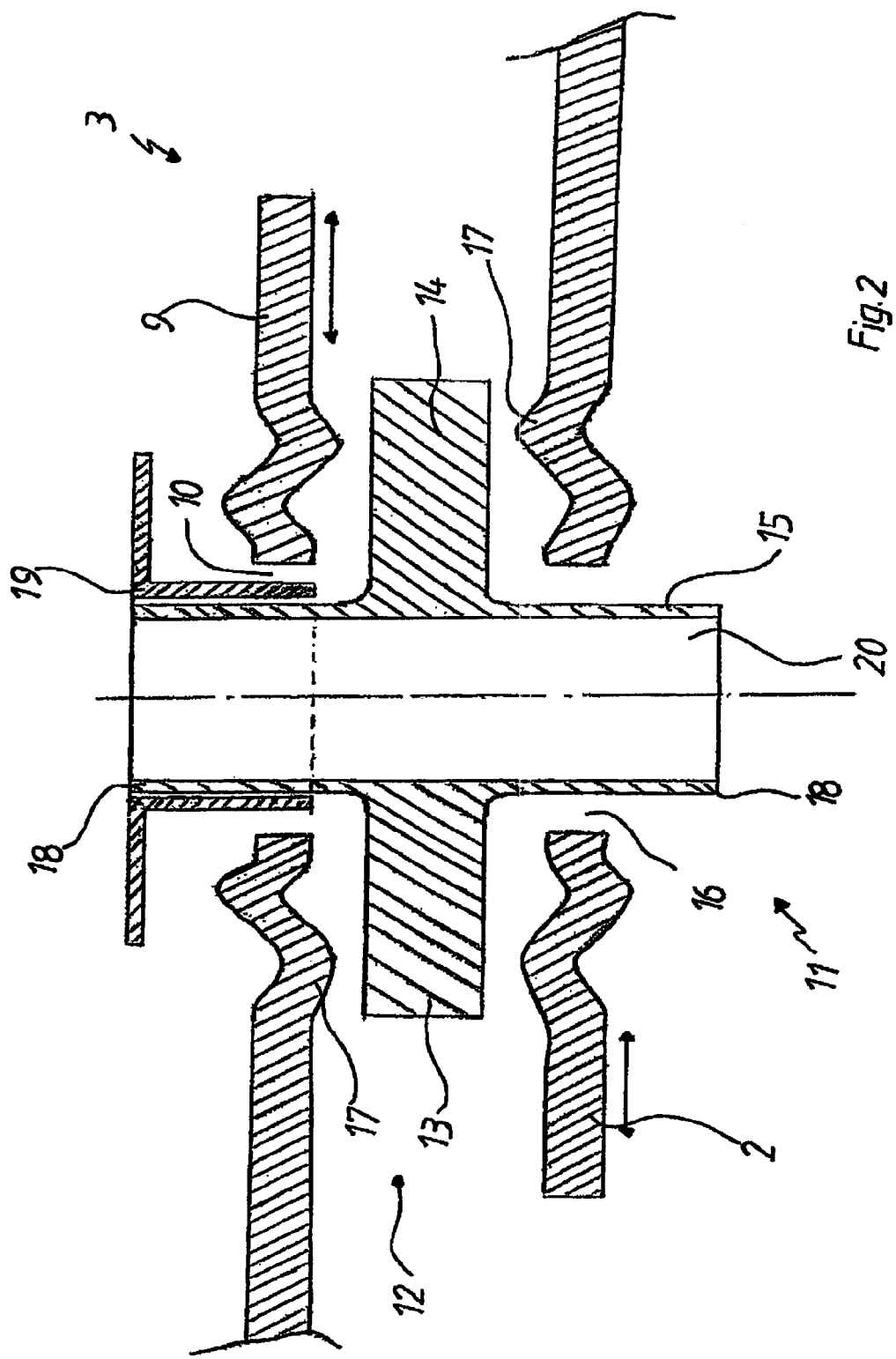

The subject matter of the invention is illustrated in the drawing with reference to one exemplary embodiment, and is described below. The drawings show the following:

FIG. 1 shows a three-dimensional illustration of a component to be shielded by a multipart heat shield; and FIG. 2 shows a partial illustration of the fixing region for two elements of a heat shield.

DETAILED DESCRIPTION

FIG. 1 shows a three-dimensional illustration of a heat shield 1, which in this example comprises two elements 2, 3. In addition, in the present example the heat shield 1 is intended to shield an exhaust manifold 4, which is only indicated. The exhaust manifold is part of an exhaust gas system, which in region 5 may contain an exhaust gas turbocharger, for example. Shown are the connection regions 6 on the engine side for the exhaust manifold 4, which comprises a geometrically complex structure in the direction of region 5. Accordingly, the individual elements 2, 3 likewise have different contour designs, i.e., are approximately adapted to the geometric structure of the exhaust manifold 4. Element 2 has an attachment region 7 on the exhaust manifold 4, and element 3 has an attachment region 8 on the exhaust gas turbocharger 5, by means of which said elements may be mounted securely to the referenced components. Different temperatures occur in the components 4, 5 used in the present example. The region of the exhaust gas turbocharger 5 has a higher temperature level than the exhaust manifold 4, resulting in different thermal expansions in the region of the heat shield 1 which have different effects on the individual elements 2, 3.

On element 3 a projection 9 having a platelike design is provided which faces in the direction of element 2 and which in the region of its free end has an oblong hole 10 which is used for accommodating a fixing element 11. By means of the fixing element 11, which is only indicated here, elements 2, 3 are fixed relative to one another, but in a manner which allows motion of the two elements relative to one another. This is not shown in FIG. 1.

FIG. 2 shows the fixing region 12. The fixing element 11 illustrated in FIG. 1 is used, and in the present example has a cross-shaped design with two leg regions 13, 14 extending parallel to elements 2, 3. The leg 15 of the fixing element 11 extending perpendicular to the leg regions 13, 14 has a hollow design. Of element 3, only the platelike projection 9 is shown. The same applies for the oblong hole 10. In the region of overlap with element 3, element 2 is likewise provided with a hole 16 oppositely situated from the oblong hole 10. The fixing element 12 thus projects with its leg through the oblong hole 10 and also through the hole 16, whereas the leg regions 13, 14 form sliding regions which allow appropriate compensation to occur when elements 2, 3 move relative to one another, without resulting in stress cracks in the region of the elements 2, 3. If necessary, profiles 17 which face the particular leg region 13, 14 may be integrally molded onto the respective element 2, 3, on the platelike projection 9 and also on the overlap region of element 2, by means of which a sliding motion of the respective element 2, 3 relative to the associated leg region 13, 14 may be provided in places. To prevent the fixing element 11 from coming loose between elements 2, 3, on the one hand at least one of the free ends 18 of the leg 15 may be flanged, for example in the direction of the platelike projection 9. If necessary, this may also be performed in the region of both free ends 18. On the other hand, a separate rivet 19 may be provided in the region of at least one of the two ends 18.

Alternatively, it is also possible to guide a rivet (not illustrated) through the cavity 20, and to press the rivet flat in the end regions, forming a rivet head.

What is claimed is:

1. A heat shield for shielding components influenced by temperature, comprising:
   a pair of heat shield elements, said heat shield elements being contoured to conform essentially with the contour of the components to be shielded, said heat shield elements at least partially overlapping one another in a overlapping region of said heat shield elements,
   said overlapping region of at least one of said heat shield elements including a projection having a plate-like structure facing in the direction of the other heat shield element,
   each of said overlapping regions of said heat shield elements including an opening,
   a fixing element disposed in said openings for fixing said heat shield elements to one another and allowing said heat shield elements to move relative to one another in said overlapping region, and
   said fixing element including a leg projecting through said openings and a pair of leg regions extending from and perpendicular to said leg, wherein said leg regions are disposed between said heat shield elements.

2. The heat shield according to claim 1, wherein said fixing element has a cross-shaped cross section.

3. The heat shield according claim 1, wherein at least one of said opening and said recess comprises an oblong hole.

4. The heat shield according to claim 1, wherein at least partial regions of said heat shield elements in said leg regions of said fixing element have profiles facing in the direction of said leg regions.

5. The heat shield according to claim 1, wherein said fixing element includes a flange spaced from said leg regions.

6. The heat shield according to claim 1, wherein said fixing element is hollow and includes a flange-forming rivet.

7. The heat shield according to claim 1, comprising a heat shield of an exhaust manifold of a vehicle.

8. The heat shield according to claim 1, comprising a heat shield of an exhaust manifold and adjacent exhaust gas turbocharger.

9. The heat shield according to claim 1 wherein said heat shield elements have different contour designs.

10. The heat shield according to claim 1 wherein said leg regions extend parallel to said heat shield elements.

* * * * *